(12) United States Patent
Kang et al.

(10) Patent No.: US 11,701,729 B1
(45) Date of Patent: Jul. 18, 2023

(54) AUTOMATIC WELDING METHOD

(71) Applicants: Samsung Engineering Co., Ltd., Seoul (KR); Hyundai Robotics Co., Ltd., Daegu (KR)

(72) Inventors: Sung Gi Kang, Yongin-si (KR); Chan Hyun Baek, Hwaseong-si (KR)

(73) Assignees: SAMSUNG ENGINEERING CO., LTD., Seoul (KR); HYUNDAI ROBOTICS CO., LTD., Daegu (KR)

( * ) Notice: Subject to any disclaimer, the term of this patent is extended or adjusted under 35 U.S.C. 154(b) by 0 days.

(21) Appl. No.: 17/874,821

(22) Filed: Jul. 27, 2022

(30) Foreign Application Priority Data

Jan. 28, 2022 (KR) .......................... 10-2022-0013613

(51) Int. Cl.
| | |
|---|---|
| *B23K 9/028* | (2006.01) |
| *B23K 37/053* | (2006.01) |
| *B23K 9/095* | (2006.01) |
| *B23K 37/02* | (2006.01) |
| *B23K 101/06* | (2006.01) |

(52) U.S. Cl.
CPC .......... *B23K 9/0282* (2013.01); *B23K 9/0956* (2013.01); *B23K 37/0229* (2013.01); *B23K 37/0538* (2013.01); *B23K 2101/06* (2018.08)

(58) Field of Classification Search
CPC ............................ B23K 9/0282; B23K 9/0956; B23K 37/0229; B23K 37/0538; B23K 2101/06
USPC ...................................................... 219/76.14
See application file for complete search history.

(56) References Cited

U.S. PATENT DOCUMENTS

| | | | |
|---|---|---|---|
| 10,556,290 | B2 * | 2/2020 | Tao ...................... B23K 9/0282 |
| 11,448,342 | B2 * | 9/2022 | Ducceschi ......... B23K 37/0531 |
| 2020/0033063 | A1 * | 1/2020 | Rajagopalan ........ B23K 9/0282 |

FOREIGN PATENT DOCUMENTS

| | | |
|---|---|---|
| JP | 1994-03966 A | 8/1992 |
| JP | 2001-340966 A | 12/2001 |
| KR | 10-1051071 B1 | 7/2011 |

(Continued)

OTHER PUBLICATIONS

Office Action issued from the Korean Intellectual Property Office dated Feb. 16, 2022 in KR Application No. 10-2022-0013613 with English translation.

(Continued)

*Primary Examiner* — Dana Ross
*Assistant Examiner* — James F Sims, III
(74) *Attorney, Agent, or Firm* — Panitch Schwarze Belisario & Nadel LLP

(57) ABSTRACT

The automatic welding method includes: carrying a pipe on which a true circle weld groove and settling the pipe at a fit-up position in the welding station and carrying a hollow connection member on which a true circle weld groove is formed to a position near the fit-up position in the welding station by using the material transport robot; measuring the alignment state of the hollow connection member with respect to the fit-up position by using a gap sensor robot, and according to the results, moving the position of the hollow connection member to align the weld groove of the pipe with the weld groove of the hollow connection member; performing a root welding on the aligned weld grooves by using a GT welding robot; and performing a filling and cap welding on the aligned weld grooves by using a GM welding robot to manufacture a 2D spool.

17 Claims, 12 Drawing Sheets

(56) References Cited

FOREIGN PATENT DOCUMENTS

| KR | 10-2012-0014624 A | 2/2012 |
| KR | 10-1990580 B1 | 6/2019 |
| WO | 2009/075525 A2 | 6/2009 |

OTHER PUBLICATIONS

Welding joint, Wikipedia, downloaded from web page: https://en.wikipedia.org/wiki/Welding-joint, Download date: Jun. 9, 2022, original posting date: unknown, 5 pages.

Notice of Allowance issued from the Korean Intellectual Property Office dated Mar. 31, 2022 in KR Application No. 10-2022-0013613 with English translation.

* cited by examiner

AUTOMATIC WELDING METHOD

CROSS-REFERENCE TO RELATED APPLICATION

This application is based on and claims priority under 35 U.S.C. § 119 to Korean Patent Application No. 10-2022-0013613, filed on Jan. 28, 2022, in the Korean Intellectual Property Office, the disclosure of which is incorporated by reference herein in its entirety.

BACKGROUND

1. Field

The present disclosure relates to an automatic welding method. More specifically, the present disclosure relates to an automatic welding method capable of automatically welding a pipe and a connection member.

2. Description of the Related Art

Oil & gas plants, industrial plants, buildings, etc., include complex pipe facilities.

In order to install a pipe facility in an oil & gas plant, an industrial plant, a building, etc., first, a plurality of pipe spools which will constitute a pipe facility are prefabricated in a pipe spool fabrication shop. Then, a plurality of prefabricated pipe spools are moved to a site such as an oil & gas plant, an industrial plant, a building, etc., and the plurality of pipe spools are connected to each other in the site.

In this manner, a plurality of pipe spools connected to each other are installed in a steel frame or civil structure that constitute an oil & gas plant, an industrial plant, a building, etc., by using a support and the like, and the plurality of pipe spools connected to each other are finally connected to a stationary equipment such as a column, vessel, tank, or a heat exchanger, or to a rotating machinery such as a compressor, or a pump, and the entire pipe facility is constructed in an oil & gas plant, industrial plant, building, etc.

On the other hand, each of the pipe spools that constitute an oil & gas plant, an industrial plant, building, etc., has a different form and size. For this reason, pipe spools are a typical small quantity batch product, and automation of manufacture has been difficult. Accordingly, in the past, it was only possible to apply an automated device in some manufacturing processes that produce pipe spools of a simple shape, and pipe spools of a complicated shape were manufactured by manually cutting, processing, and moving members such as pipes, and by manually welding pipes and fitting members in each workshop.

In addition, in the past, multiple tasks such as drawing management, member management, and inspection task essential for fabricating pipe spools have still been processed based on paper works, and each manufacturing process required a responsible personnel.

In addition, welding is needed in order to connect a pipe to another pipe or a pipe to a hollow connection member such as a fitting member, and because welding operation has been done manually or semi-automatically, not only a lot of time and manpower have been required in a welding operation, but also there have been issues of welding defects.

SUMMARY

An embodiment of the present disclosure provides an automatic welding method capable of automatically welding pipes and connection members.

Additional aspects will be set forth in part in the description which follows and, in part, will be apparent from the description, or may be learned by practice of the presented embodiments of the disclosure.

According to an aspect, an automatic welding method is provided, the method including:

(S110) carrying a pipe on which a weld groove is formed in a form of a true circle and settling the pipe at a fit-up position in the welding station by using a material transport robot;

(S120) carrying a hollow connection member on which a weld groove is formed in a form of a true circle to a position near the fit-up position in the welding station by using the material transport robot;

(S130) measuring the alignment state of the hollow connection member with respect to the fit-up position in the welding station by using a gap sensor robot, and according to the results, moving the position of the hollow connection member by using the material transport robot to align the weld groove of the pipe with the weld groove of the hollow connection member;

(S140) performing a root welding on the aligned weld grooves by using a GT welding robot; and (S150) performing a filling and cap welding on the aligned weld grooves by using a GM welding robot to manufacture a 2D spool.

The steps (S130) to (S150) may be performed in a state in which the pipe is fixed at the fit-up position in the welding station, and the hollow connection member is gripped by the material transport robot.

The GT welding robot may include a GT welding robot A and a GT welding robot B, and the step (S140) may include (S140-1) welding the left semi-circle area of the entire root welding area by using the GT welding robot A and (S140-2) welding the right semi-circle area of the entire root welding area by using the GT welding robot B.

The GT welding robot may include a first sensor and a first welder, the first sensor being configured to continuously measure a position of a root weld seam, and the first welder being configured to continuously perform a root welding according to a predetermined sequence based on the results of measurement of the first sensor.

The step (S150) is performed in a state in which the root-welded pipe and the root-welded hollow connection member are simultaneously rotated by a plurality of rollers installed in the welding station, and the GM welding robot may perform a filling and cap welding in a flat welding position.

The weld groove includes: a 1-1 curved surface, a 1-2 curved surface, a 1-3 curved surface and a 1-4 curved surface formed each on the outer wall of the pipe and on the outer wall of the hollow connection member, the 1-1 curved surface being slantly formed so that a thickness at a first point relatively far from a side end of the hollow connection member is relatively thick, and a thickness at a second point relatively close to the side end of the hollow connection member is relatively thin, the 1-2 curved surface being slantly formed so that a thickness at the second point relatively close to the side end of the hollow connection member is relatively thick, and a thickness at a third point relatively closer to the side end of the hollow connection member is relatively thin, the 1-3 curved surface being slantly formed so that a thickness at the third point relatively closer to the side end of the hollow connection member is relatively thick, and a thickness at a fourth point relatively even more closer to the side end of the hollow connection member is relatively thin, and the 1-4 curved surface being formed so that a thickness is constant from the fourth point relatively even more closer to the side end of the hollow connection member to the side end of the hollow connection member;

a vertical surface formed each between the inner wall and the outer wall of the pipe and between the inner wall and the outer wall of the hollow connection member;

and a 2-1 curved surface and a 2-2 curved surface formed each on the inner wall of the pipe and on the inner wall of the hollow connection member, the 2-1 curved surface being formed so that a thickness is constant from the side end of the pipe or the hollow connection member to a fifth point separated from the side end of the pipe or the hollow connection member, and the 2-2 curved surface being slantly formed so that a fifth point separated from the side end of the pipe or the hollow connection member is relatively thin, and a thickness at a sixth point relatively far from the side end of the pipe or the hollow connection member is relatively thick.

The 1-1 curved surface may be formed so that a thickness decreases at a constant rate from the first point to the second point.

The 1-2 curved surface may be formed so that a thickness decreases at a constant rate from the second point to the third point.

The 1-3 curved surface may be formed so that a thickness decreases according to a predetermined radius of curvature from the third point to the fourth point.

A length of the 1-4 curved surface may be 2 mm to 3 mm.

A thickness of the vertical surface formed each on the side end of the pipe and the side end of the hollow connection member may be 1 mm to 2 mm.

The 2-2 curved surface may be formed so that a thickness increases at a constant rate from the fifth point to the sixth point.

The first point may be positioned relatively far from the side end of the pipe or the hollow connection member than the sixth point, and the second point may be relatively closer to the side end of the pipe or the hollow connection member than the fifth point.

A thickness between the inner wall and the outer wall of the pipe at the second point may be 87.5% to 95% with respect to 100% of the thickness between the inner wall and the outer wall of the pipe at the first point, and a thickness between the inner wall and the outer wall of the hollow connection member at the second point may be 87.5% to 95% with respect to 100% of the thickness between the inner wall and the outer wall of the hollow connection member at the first point.

According to another aspect, an automatic welding method is provided, the method including:

(S210) carrying a 2D spool manufactured according to the automatic welding method and on which a weld groove is formed in a form of a true circle and settling the 2D spool at a fit-up position in a welding station by using a material transport robot;

(S220) carrying a hollow member on which a weld groove is formed in a form of a true circle to a position near a fit-up position in the welding station by using the material transport robot;

(S230) determining whether an angle sensing test is needed between the 2D spool and the hollow member by using a control unit;

(S240) measuring a torsion angle between the 2D spool and the hollow member by using an angle sensor robot and rotating the hollow member by the measured torsion angle by using the material transport robot, when the control unit determines that an angle sensing test is needed between the 2D spool and the hollow member;

(S250) measuring the alignment state of the hollow member with respect to the fit-up position in the welding station by using a gap sensor robot, and according to the results of measurement, moving the position of the hollow member to align the weld groove of the 2D spool with the weld groove of the hollow member by using the material transport robot;

(S260) performing a root welding on the aligned weld grooves by using a GT welding robot; and (S270) performing a filling and cap welding on the aligned weld grooves to manufacture a 3D spool by using a GM welding robot.

The GT welding robot may include a GT welding robot A and a GT welding robot B, and the step (S260) may include (S260-1) welding the left semi-circle area of the entire root welding area by using the GT welding robot A and (S260-2) welding the right semi-circle area of the entire root welding area by using the GT welding robot B.

The GM welding robot may include a GM welding robot A and a GM welding robot B, and the step (S270) may include: (S270-1) welding the left semi-circle area of the entire filling and cap welding area from bottom to top by using the GM welding robot A; (S270-2) grinding the weld starting part of the step (S270-1) by using a grinding robot; and (S270-3) welding the right semi-circle area of the entire filling and cap welding area by using the GM welding robot B.

The GM welding robot may include a second sensor and a second welder, the second sensor being configured to continuously measure the position of a filling and cap weld seam, and the second welder being configured to continuously perform a filling and cap welding according to a predetermined sequence based on the results of measurement of the second sensor.

An automatic welding method according to an embodiment of the present disclosure may reduce welding time and manpower requirements, and may prevent welding defects.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
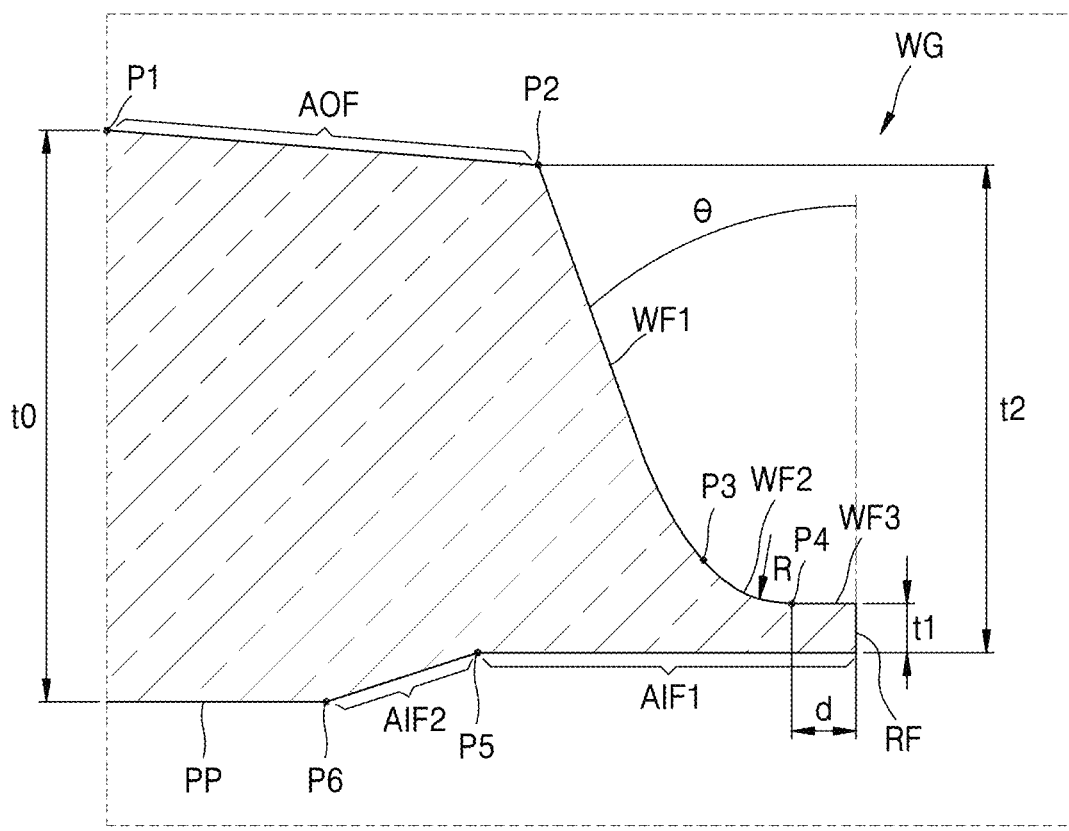
FIG. 1 is a diagram schematically illustrating a weld groove to which an automatic welding method according to embodiments of the present disclosure is applied, and the weld groove is formed at a side end of a pipe in a form of a true circle.

Reference will now be made in detail to embodiments, embodiments of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of at least one of the associated listed items. Expressions such as "at least one of," when preceding a list of elements, modify the entire list of elements and do not modify the individual elements of the list.

Hereinafter, a weld groove forming method and a hollow member according to an embodiment of the present disclosure will be described in detail with reference to the drawings.

As used herein, the term "weld groove" refers to a processed portion formed between to-be-weld base materials (i.e., pipes, hollow connection members and hollow members) for an efficient welding. Specifically, the term "weld groove" is a concept collectively referring to all cut surfaces formed at an inner wall, side end, and outer wall of one end or both ends of each base material.

In addition, as used herein, the term "welding station" refers to a place where a welding facility is installed.

As used herein, the term "hollow member" refers to a member having a penetration hole extending from one end to the other end. Specifically, the "hollow member" is a term collectively referring to pipes, 2D spools, and hollow connection members.

As used herein, the term "side end of a hollow member" refers to an end portion on an entrance side or an exit side of a penetration hole among end portions of the hollow member.

As used herein, the term "sensor robot (vision sensor)" refers to a device having a function of scanning a side end of the hollow member in 2D or 3D, a function of storing the scanned image of the hollow member as a measured image, a function of forming a virtual image in a form of an annular ring, a function of overlapping the virtual image with the measured image and figuring out whether the thickness portion of the virtual image is completely included in the thickness portion of the measured image, and also the ratio of the thickness of the virtual image to the average thickness of the measured image satisfies a reference value, a function of determining that the side end of the hollow member may be processed into a form of a true circle when the thickness portion of the virtual image is completely included in the thickness portion of the measured image, and also the ratio of the thickness of the virtual image to the average thickness of the measured image satisfies a reference value, a function of determining the side end of the hollow member may not be processed into a form of a true circle when the thickness portion of the virtual image is not completely included in the thickness portion of the measured image, or the ratio of the thickness of the virtual image to the average thickness of the measured image does not satisfy a reference value, a function of transmitting a beveling initiation signal to an automatic beveling machine, and a function of continuously measuring the distance between the beveling blade of the automatic beveling machine and a to-be-beveled part of the hollow member and continuously transmitting the measured value to the automatic beveling machine. Furthermore, the virtual image has a feature of having a predetermined annular ring size (i.e., a distance between the inner wall and the outer wall).

As used herein, the term "automatic beveling machine" refers to a device forming a weld groove by beveling a portion including a side end of a hollow member in conjunction with a sensor robot.

As used herein, the term "point of a pipe, a hollow connection member, or a hollow member" refers to an arbitrary point present on an arbitrary vertical line perpendicular to the central axis of a pipe, a hollow connection member or a hollow member.

In addition, as used herein, the term "central axis of a hollow member" means a line extending in a direction parallel to the direction in which the penetration hole extends and passing through the center of the penetration hole.

As used herein, the term "distance between the any two points of a pipe, a hollow connection member, or a hollow member" refers to a distance between vertical lines orthogonal to the central axis of each member passing through each point.

In addition, as used herein, the term "2D spool (two dimensional spool)" refers to a member manufactured by welding a non-welded hollow member to another non-welded hollow member. When manufacturing 2D spools, it is not necessary to specify the coupling position on the circumference of each of the hollow members, which are the the welding targets.

As used herein, the term "3D spool (three dimensional spool)" means a member manufactured by welding a 2D spool with at least one or more welded hollow members (including a 2D spool) and/or at least one or more non-welded hollow members. When manufacturing 3D spools, each of the coupling positions on the circumference of the members to be welded may be specified, or may not be specified.

In addition, as used herein, the term "torsion angle between a 2D spool and a hollow member" refers to a misaligned angle, when a coupling position on a circumference of a hollow member is not in line with a coupling position on a circumference of a 2D spool but is misaligned. That is, a coupling position on a circumference of a 2D spool and a coupling position on a circumference of a hollow member welded thereto are predetermined according to the geometric structure of the 2D spool and the hollow member (that is, when the hollow member is a flange, the geometric structure of the hollow member is the position of a hole, or when the hollow member is an L-shaped member, the geometric structure of the hollow member is the direction of the bended portion, etc.), when a coupling position on a circumference of a hollow member is in line with respect to the coupling position on a circumference of a 2D spool, the torsion angle becomes "0", when the two coupling positions are not in line with each other, the torsion angle is not "0", and the larger the inconsistency the greater the torsion angle increases.

In addition, as used herein, "material transport robot rotates a hollow member by a torsion angle" means that a material transport robot rotates a hollow member until a torsion angle between a 2D spool and the hollow member becomes "0".

As used herein, the term "fit-up position" means a position aligning weld grooves (specifically, root faces) of two members.

As used herein, the term "fit-up" or "alignment" means bringing two members close to each other so that the central axes of two members are in line with each other.

As used herein, the term "root welding" refers to a primary welding performed on a weld groove without a tack welding.

As used herein, the term "filling and cap welding" refers to a finishing welding performed on a weld groove after a root welding.

FIG. 1 is a diagram schematically illustrating a weld groove (WG) formed at a side end of a pipe in a form of a true circle to which an automatic welding method according to embodiments of the present disclosure is applied.

Referring to FIG. 1, a weld groove (WG) for applying an automatic welding method according to embodiments of the present disclosure may include a 1-1 curved surface (AOF), a 1-2 curved surface (WF1), a 1-3 curved surface (WF2), and a 1-4 curved surface (WF3) formed on an outer wall of a pipe (PP) in this order.

The 1-1 curved surface (AOF) may be slantly formed so that a thickness at a first point (P1) relatively far from a side end of the pipe (PP) is relatively thick, and a thickness at a second point (P2) relatively close to the side end of the pipe (PP) is relatively thin. For example, the 1-1 curved surface (AOF) may be formed so that a thickness decreases at a constant rate from the first point (P1) to the second point (P2). This 1-1 curved surface (AOF) minimizes the outer step difference of the pipe (PP) and a connection member (CM) welded thereto, so that welding beads formed between the two members may be homogeneously and smoothly connected. Here, "thickness" means a distance between an inner wall and an outer wall of the pipe (PP).

The 1-2 curved surface (WF1) may be slantly formed so that a thickness at a second point (P2) relatively close to the side end of the pipe (PP) is relatively thick, and a thickness at a third point (P3) relatively closer to the side end of the pipe (PP) is relatively thin. For example, the 1-2 curved surface (WF1) may be formed so that a thickness decreases at a constant rate from the second point (P2) to the third point (P3). In addition, a slope (θ) of the 1-2 curved surface (WF1) may be 20° based on the vertical line which is vertically extended from the vertical surface (RF), which will be described later, but the present disclosure is not limited thereto.

The 1-3 curved surface (WF2) may be slantly formed so that a thickness at a third point (P3) relatively closer to the side end of the pipe (PP) is relatively thick, and a thickness at a fourth point (P4) relatively even more closer to the side end of the pipe (PP) is relatively thin. For example, the 1-3 curved surface (WF2) may be formed so that a thickness decreases according to a predetermined radius of curvature (R) from the third point (P3) to the fourth point (P4). For example, the radius of curvature (R) may be 5 mm, but the present disclosure is not limited thereto. As the weld groove (WG) includes the 1-3 curved surface (WF2), not only the processing of the weld groove (WG) may become easier, but also quality of the welding may improve.

The 1-4 curved surface (WF3) may be formed so that a thickness is constant from the fourth point (P4) even more closer to the side end of the pipe (PP) to the side end of the pipe (PP). For example, a length (d) of the 1-4 curved surface (WF3) may be 2 mm to 3 mm. When a length (d) of the 1-4 curved surface (WF3) is 2 mm to 3 mm, when an automatic root welding is performed, a vertical surface (RF), which will be described later, is adequately melted, and thus a back bead may be well-formed. On the other hand, when a length of the 1-4 curved surface (WF3) is less than 2 mm, when an automatic root welding is performed, the vertical surface (RF) is not sufficiently melted, so that a back bead, which is formed only when melt of a welding material fully penetrates between the vertical surface (RF) and a corresponding vertical surface of another member welded thereto, may not be formed. In addition, when a length of the 1-4 curved surface (WF3) exceeds 3 mm, when an automatic filling and cap welding is performed, a portion of the 1-4 curved surface (WF3) (i.e., the portion not welded when an automatic root welding is performed) may be excessively melted, and a hole may form in the 1-4 curved surface (WF3).

In addition, a weld groove (WG) may include a vertical surface (RF).

A vertical surface (RF) may be formed between an inner wall and an outer wall of the pipe (PP). For example, a thickness (t1) of a vertical surface (RF) formed on a side end of the pipe (PP) may be 1 mm to 2 mm. When a thickness (t1) of a vertical surface (RF) is 1 mm to 2 mm, when an automatic root welding is performed, the vertical surface (RF) is adequately melted, and thus a back bead may be well-formed. On the other hand, when a thickness (t1) of a vertical surface (RF) is less than 1 mm, when an automatic root welding is performed, the vertical surface (RF) may excessively melt so that a gap (burn through) may form between the vertical surface (RF) and a corresponding vertical surface of another member welded thereto. In addition, when a thickness (t1) of a vertical surface (RF) exceeds 2 mm, when an automatic root welding is performed, the vertical surface (RF) is not sufficiently melted, so that a back bead, which is formed only when melt of a welding material fully penetrates between the vertical surface (RF) and a corresponding vertical surface of another member welded thereto, may not be formed.

In addition, a weld groove (WG) may further include a 2-1 curved surface (AIF1) and a 2-2 curved surface (AIF2) which are formed on an inner wall of the pipe (PP).

The 2-1 curved surface (AIF1) may be formed so that a thickness is constant from the side end of the pipe (PP) to a fifth point (P5) separated from the side end of the pipe (PP).

The 2-2 curved surface (AIF2) may be slantly formed so that a thickness at the fifth point (P5) relatively close to the side end of the pipe (PP) is relatively thin, and a thickness at a sixth point (P6) relatively far from the side end of the pipe (PP) is relatively thick. For example, the 2-2 curved surface (AIF2) may be formed so that a thickness increases at a constant rate from the fifth point (P5) to the sixth point (P6).

The first point (P1) may be positioned relatively far from the side end of the pipe (PP) than the sixth point (P6), and the second point (P2) may be positioned relatively closer to the side end of the pipe (PP) than the fifth point (P5). In this case, a thickness (t2) between the inner wall and the outer wall of the pipe (PP) at the second point (P2) may be 87.5% to 95% with respect to 100% of the thickness between the inner wall and the outer wall of the pipe (PP) at the first point (P1). When a thickness (t2) is within the range, an excellent welding joint strength may be secured.

A weld groove identical to the above-described weld groove (WG) may be formed in a hollow connection member (CM in FIG. 4) in the same manner as described above.

A hollow connection member (CM) may include a fitting member such as an elbow, a reducer, or a tee, or a flange member.

The weld groove (WG) described above has a special structure in a form of a true circle, on which an automatic welding may be performed, and thus is advantageous. The present inventors developed a weld groove forming method which allows an automatic welding of a hollow member, and a hollow member which is manufactured according to the method and has a true circular weld groove of a special structure after striving hard to reduce welding costs by shortening welding time and reducing manpower required for welding, and to improve welding quality In addition, the present inventors found that an automated welding is impossible for the existing weld grooves (including the weld joints disclosed at https://en.wikipedia.org/wiki/Weldinq joint).

Figure 2:
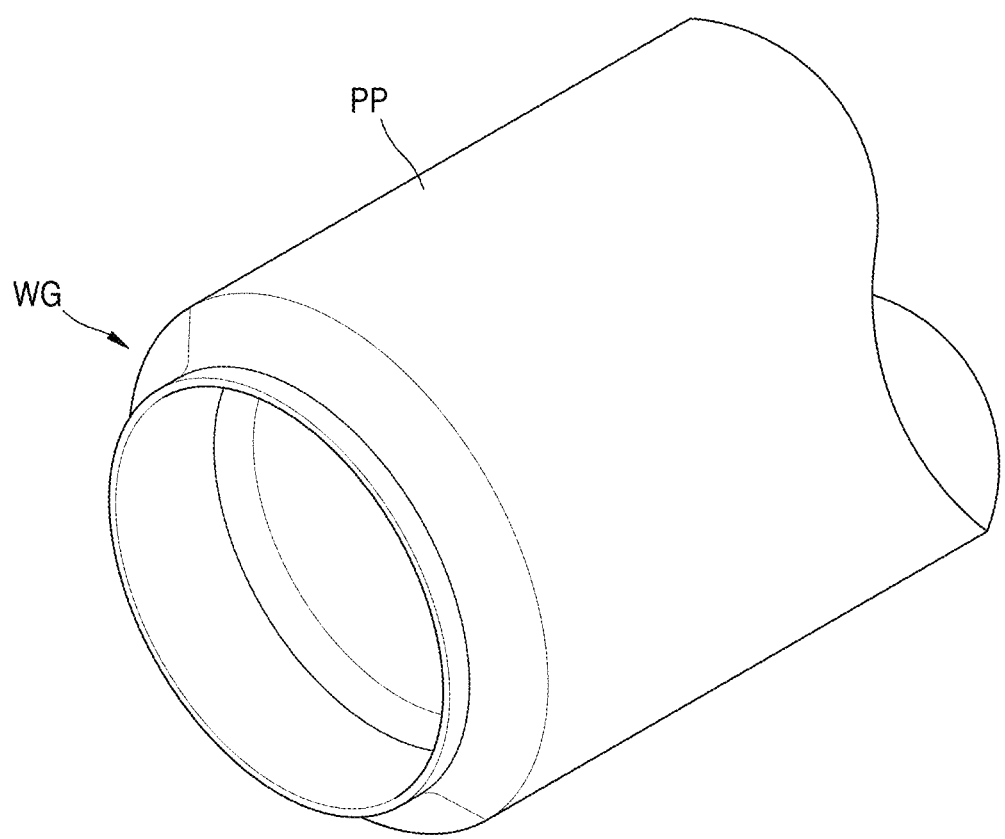
FIG. 2 is a diagram schematically showing a portion of a pipe on which a weld groove is formed in a form of a true circle.

FIG. 2 is a diagram schematically showing a portion of a pipe on which a weld groove is formed in a form of a true circle. This weld groove (WG) in a form of a true circle may be formed on only one end of a pipe (PP) or may be formed on one end and the other end of a pipe (PP), so that a total of 2 may be formed.

Referring to FIG. 2, it can be seen that the weld groove (WG) formed by cutting the inner wall, the side end, and the outer wall of the pipe (PP) at the side end of the pipe (PP) and the adjacent portion thereof is formed in a true circle shape along the circumference of the pipe (PP).

Figure 3:
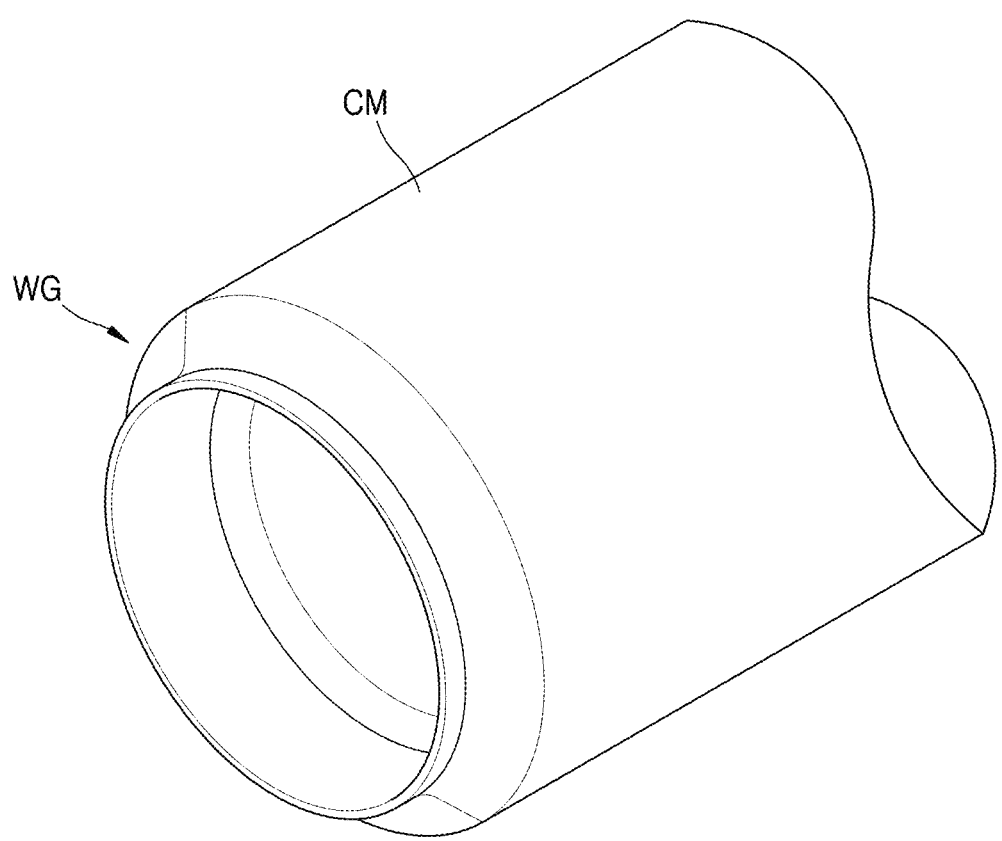
FIG. 3 is a diagram schematically showing a portion of a hollow connection member on which a weld groove is formed in a form of a true circle.

FIG. 3 is a diagram schematically showing a portion of a hollow connection member (CM) on which a weld groove (WG) is formed in a form of a true circle. This weld groove (WG) in a form of a true circle may be formed on only one end of a hollow connection member (CM) or may be formed one end and the other end of a hollow connection member (CM), so that a total of 2 may be formed.

Referring to FIG. 3, it can be seen that the weld groove (WG) formed by cutting the inner wall, the side end, and the outer wall of the hollow connection member (CM) at the side end of the hollow connection member (CM) and the adjacent portion thereof is formed in a true circle shape along the circumference of the hollow connection member (CM).

Figure 4:
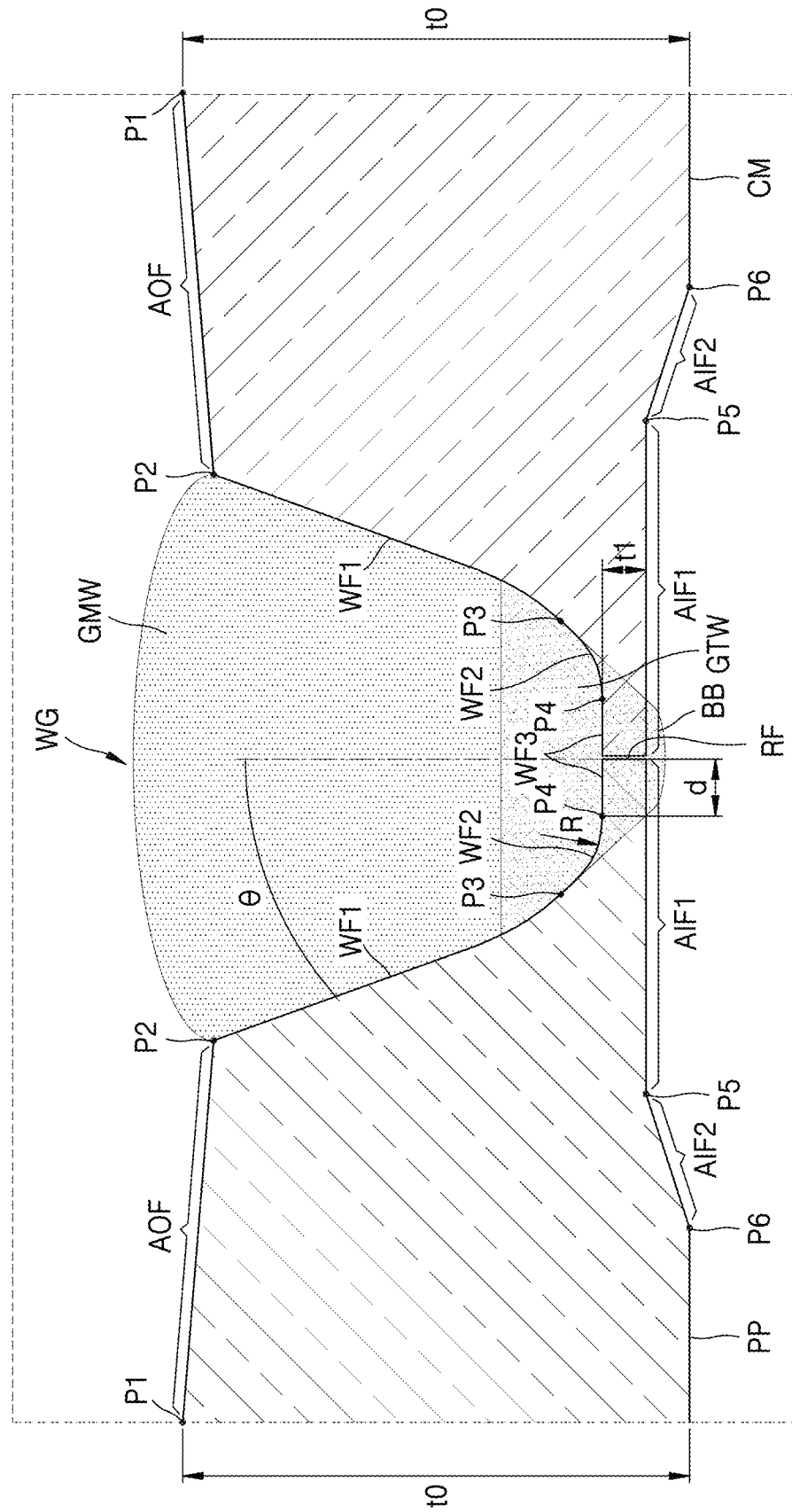
FIG. 4 is a diagram for explaining a method of welding to each other a weld groove formed in a pipe in a form of a true circle and a weld groove formed in a hollow connection member in a form of a true circle.

FIG. 4 is a diagram for explaining a method of welding to each other a weld groove (WG) formed on a pipe (PP) in a form of a true circle and a weld groove (WG) formed on a hollow connection member (CM) in a form of a true circle.

Referring to FIG. 4, a root face (RF) of a weld groove (WG) of the pipe (PP) and a root face (RF) of a weld groove (WG) of the hollow connection member (CM) may be aligned with each other, and an automatic root welding (gas tungsten welding; GTW) and automatic filling and cap welding (gas metal welding; GMW) may be performed sequentially on the weld faces (WF1, WF2, and WF3) of two members.

The automatic root welding may be relatively small quantity welding, and the automatic filling and cap welding may be relatively large quantity welding.

The automatic root welding (GTW) and the automatic filling and cap welding (GMW) may be automatically performed without an intervention of a manual operation by individual actions and interactions of a material transport robot, gap sensor robot, angle sensor robot, automatic root welding robot (GT welding robot) and/or automatic filling and cap welding robot (GM welding robot). This will be described later with reference to FIGS. 5 to 12.

Figure 5:
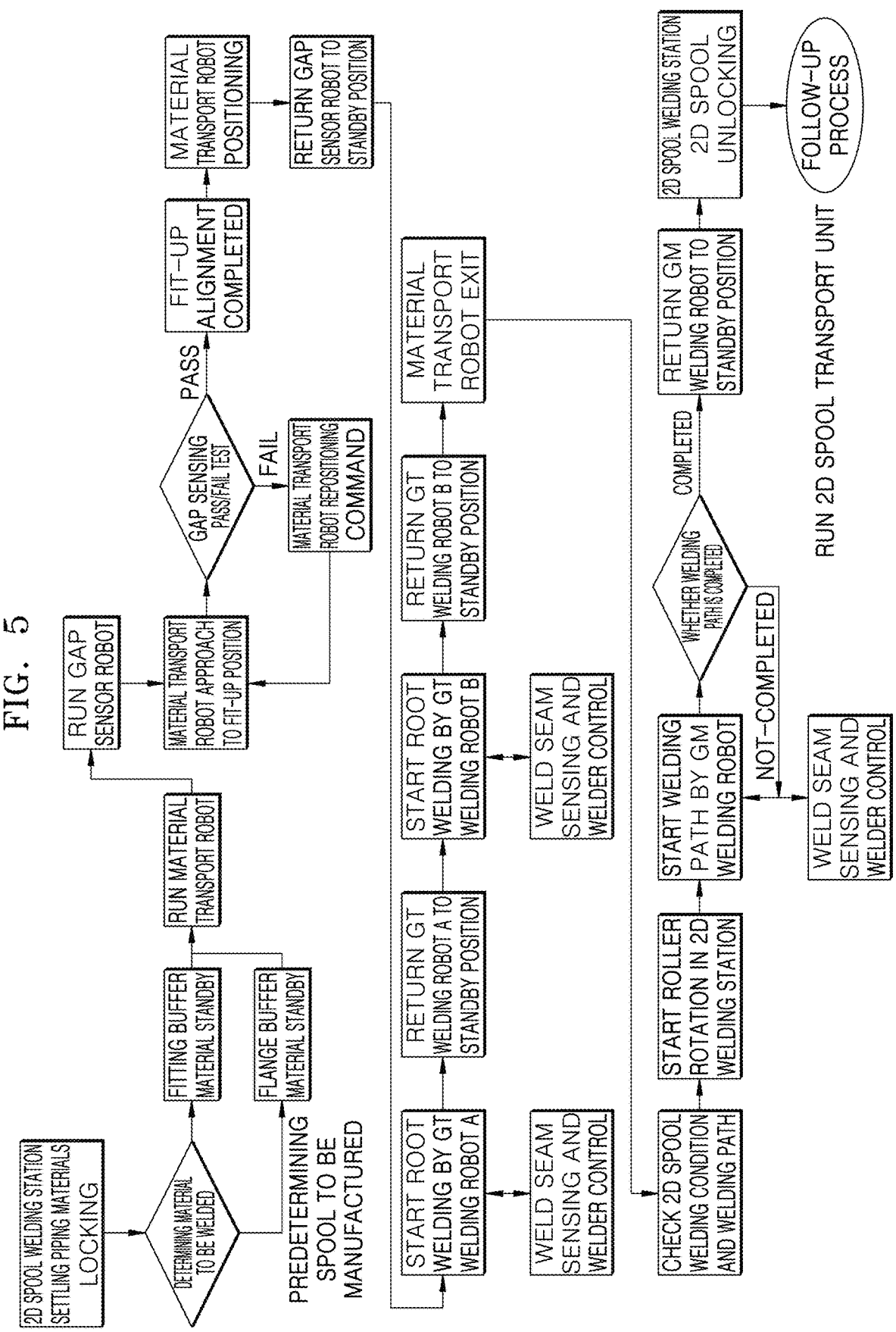
FIG. 5 is a diagram for explaining an automatic welding method according to a first embodiment of the present disclosure.
Figure 6:
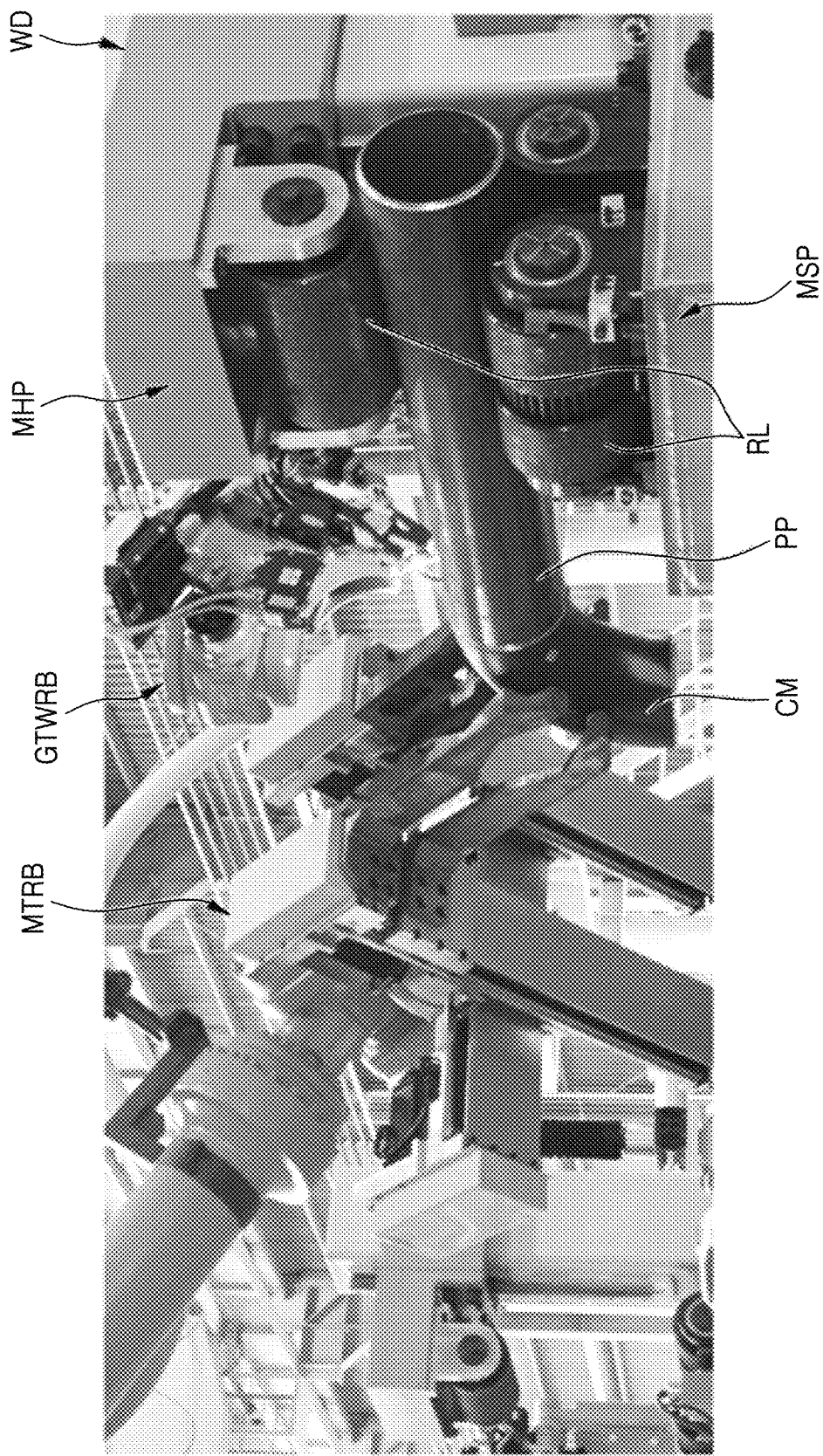
FIGS. 6 to 10 are diagrams for explaining an automatic welding system for performing the automatic welding method according to the first embodiment of the present disclosure.
Figure 7:
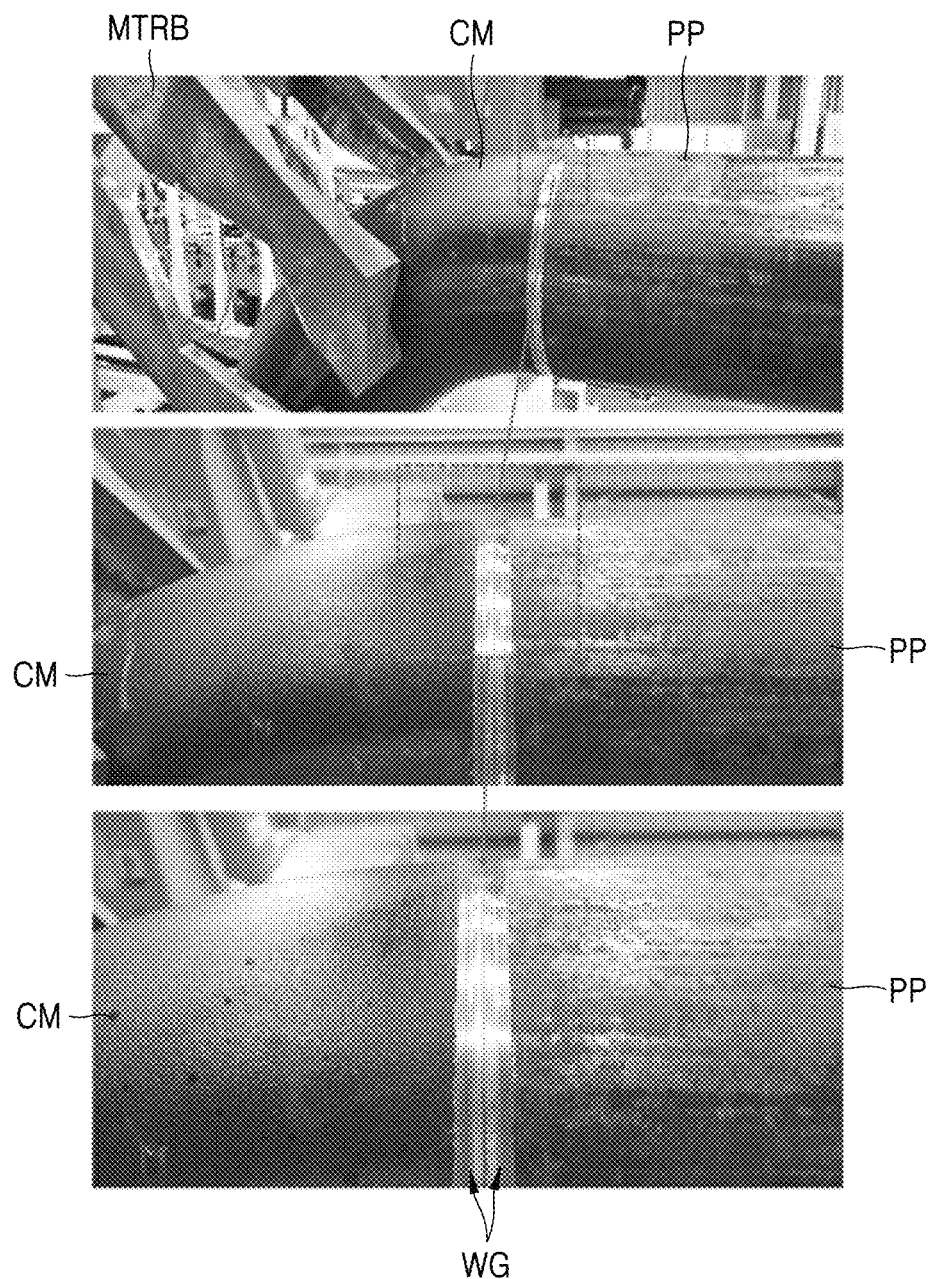
Figure 8:
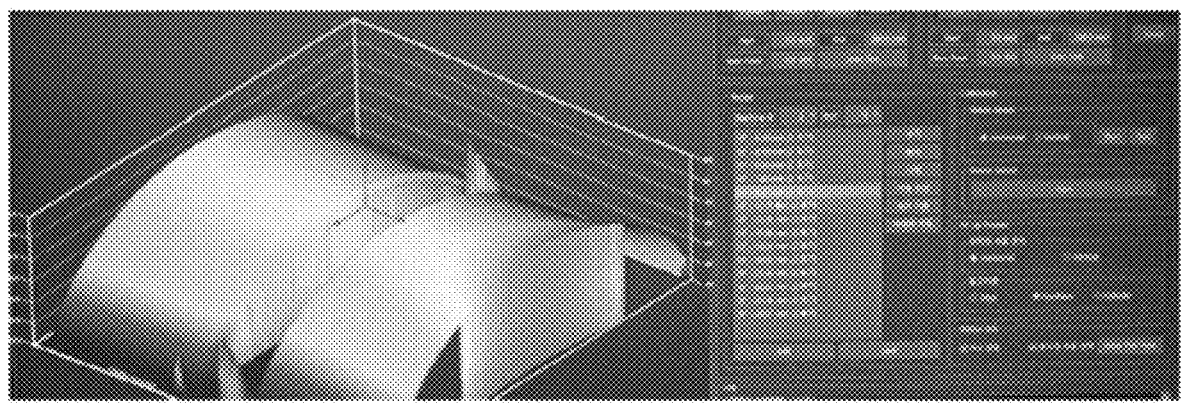

FIG. 5 is a diagram for explaining an automatic welding method according to a first embodiment of the present disclosure, and FIGS. 6 to 10 are diagrams for explaining an automatic welding system for performing an automatic welding method according to the first embodiment of the present disclosure. FIG. 8 is an image measured by a gap sensor robot which shows an alignment state of a root face (RF) of a weld groove (WG) of a pipe (PP) and a root face (RF) of a weld groove (WG) of a hollow connection member (CM).

Referring to FIGS. 5 to 10, an automatic welding method according to the first embodiment of the present disclosure may be performed through the following processes.

First, referring to FIGS. 5 to 8, a material transport robot (MTRB) carries a pipe (PP) (i.e., piping material) on which a weld groove (WG) in a form of a true circle is formed and settles the pipe at a fit-up position in a welding station (i.e., 2D spool welding station) (step (S110)). Specifically, the pipe (PP) may be held and fixed by rollers (RL) installed in the welding station.

Thereafter, the control unit (not shown) determines the material to be welded to determine the spool to be manufactured. For example, the control unit may select a fitting material or a flange material as a material to be welded to the pipe (PP).

Thereafter, according to instructions of the control unit, a material transport robot (MTRB) carries a hollow connection member (CM) (i.e., a fitting material or flange material) on which a weld groove is formed in a form of a true circle to a position near the fit-up position in the welding station (step (S120)).

Thereafter, a gap sensor robot (not shown) measures the alignment state of the hollow connection member (CM) with respect to the pipe (PP) fixed at the fit-up position in the welding station, and according to the results of measurement, the material transport robot (MTRB) moves the position of the hollow connection member (CM) so that the weld groove (WG) of the pipe (PP) and the weld groove (WG) of the hollow connection member (CM) are aligned with each other (step (S130)). The step (S130) may be performed repeatedly until an alignment state of the weld groove (WG) of the pipe (PP) and the weld groove (WG) of the hollow connection member (CM) reaches an admittable level. As a result, the weld groove (WG) of the pipe (PP) and the weld groove (WG) of the hollow connection member (CM) may be all automatically aligned with No-Gap.

After the step (S130), the material transport robot (MTRB) is fixed in a state gripping the hollow connection member (CM), and the gap sensor robot may be returned to a standby position.

Figure 9:
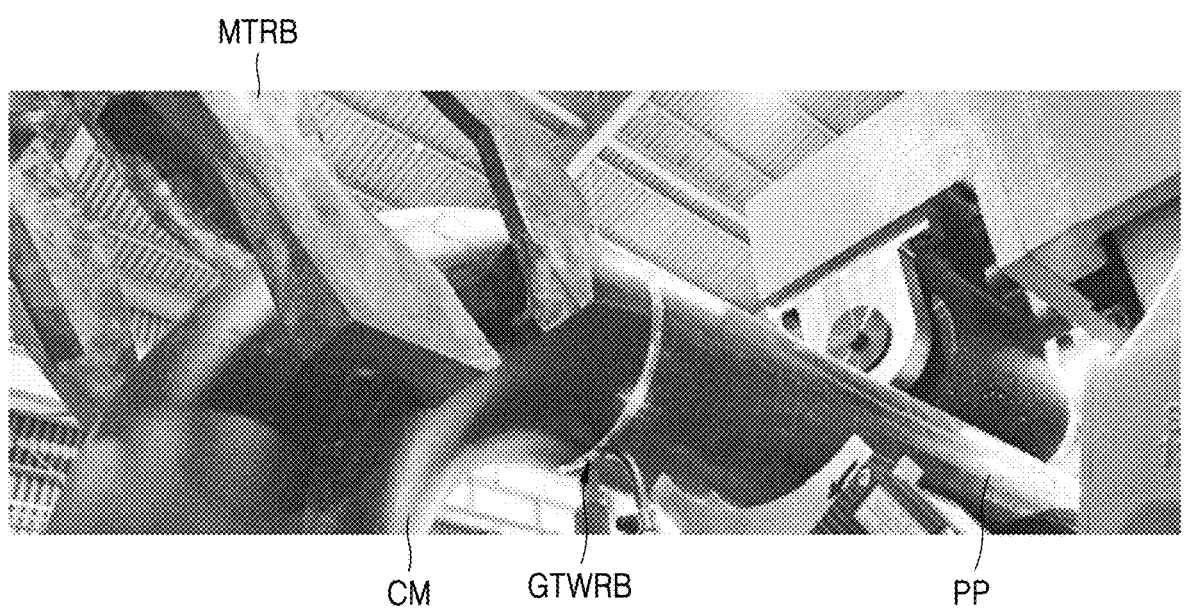

Next, referring to FIGS. 5 and 9, a GT welding robot (GTWRB) performs a root welding on the aligned weld grooves (WG) (step (S140)). Accordingly, the weld groove (WG) of the pipe (PP) and the weld groove (WG) of the hollow connection member (CM) may be all automatically primarily welded with No-Tack.

Specifically, the GT welding robot (GTWRB) may include a GT welding robot A and a GT welding robot B, and the step (S140) may include (S140-1) welding the left semi-circle area of the entire root welding area by using the GT welding robot A and (S140-2) welding the right semicircle area of the entire root welding area by using the GT welding robot B. The GT welding robot A and the GT welding robot B may return to a standby position after completing a root welding assigned to each GT welding robot. In addition, the GT welding robot A and the GT welding robot B may have the same configuration.

More specifically, a GT welding robot (GTWRB) may include a first sensor (not shown) and a first welder (not shown).

The first sensor may be configured to continuously measure a position of a root welding seam.

The first welder may be configured to continuously perform a root welding according to a predetermined sequence based on the results of measurement of the first sensor.

Figure 10:
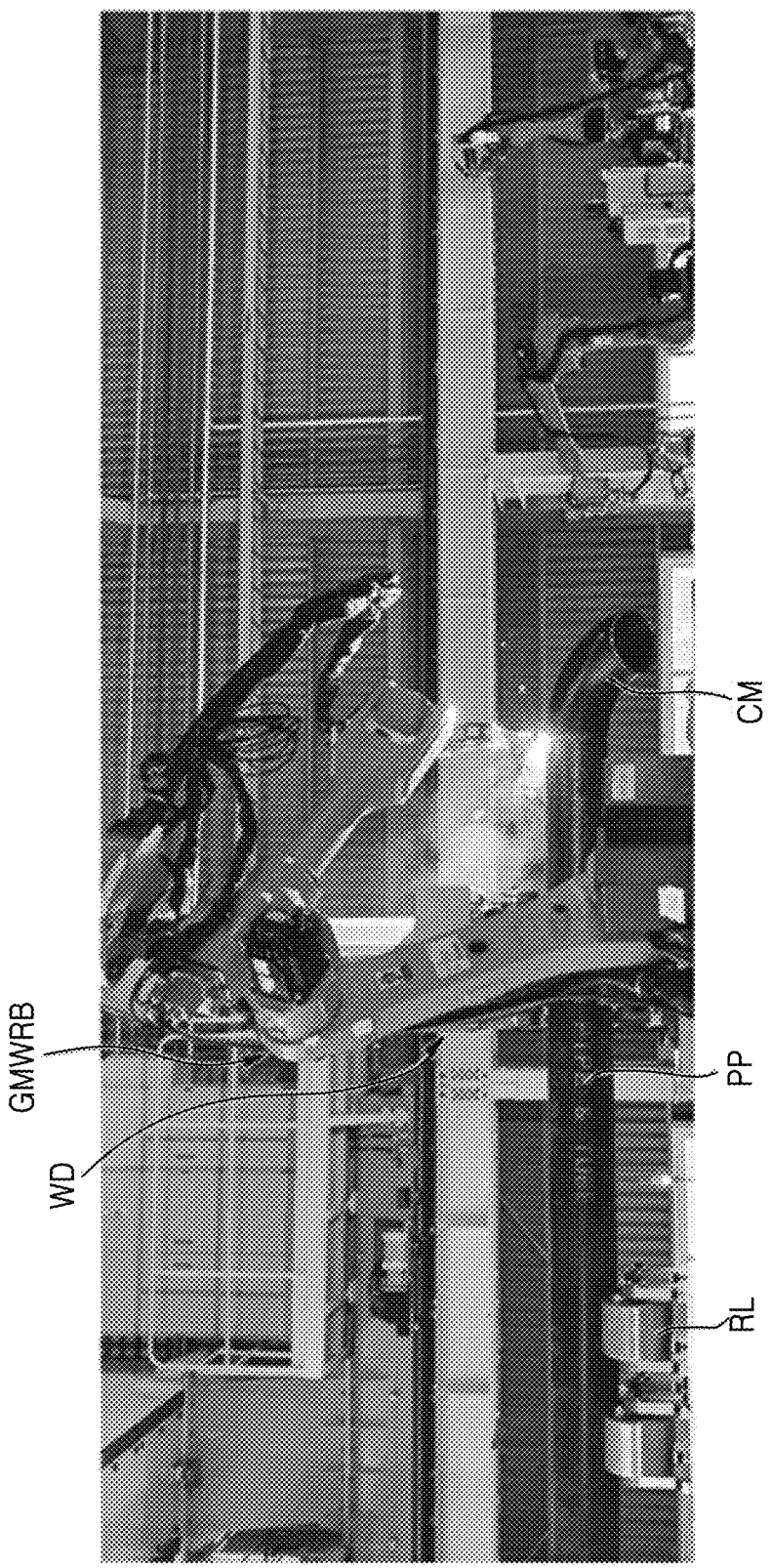

Next, referring to FIGS. 5 and 10, a GM welding robot (GMWRB) performs a filling and cap welding on the aligned weld grooves (WG) to manufacture a 2D spool (step (S150)).

The step (S150) may be performed while the root welded pipe (PP) and the root welded hollow connection member (CM) are rotated simultaneously by a plurality of rollers (RL) installed in the welding station. Accordingly, the GM welding robot (GMWRB) may perform a filling and cap welding in a flat welding position.

The step (S130) and the step (S140) may be performed in a state in which the pipe (PP) is fixed at the fit-up position in the welding station, and the hollow connection member (CM) is gripped by the material transport robot (MTRB).

Figure 11:
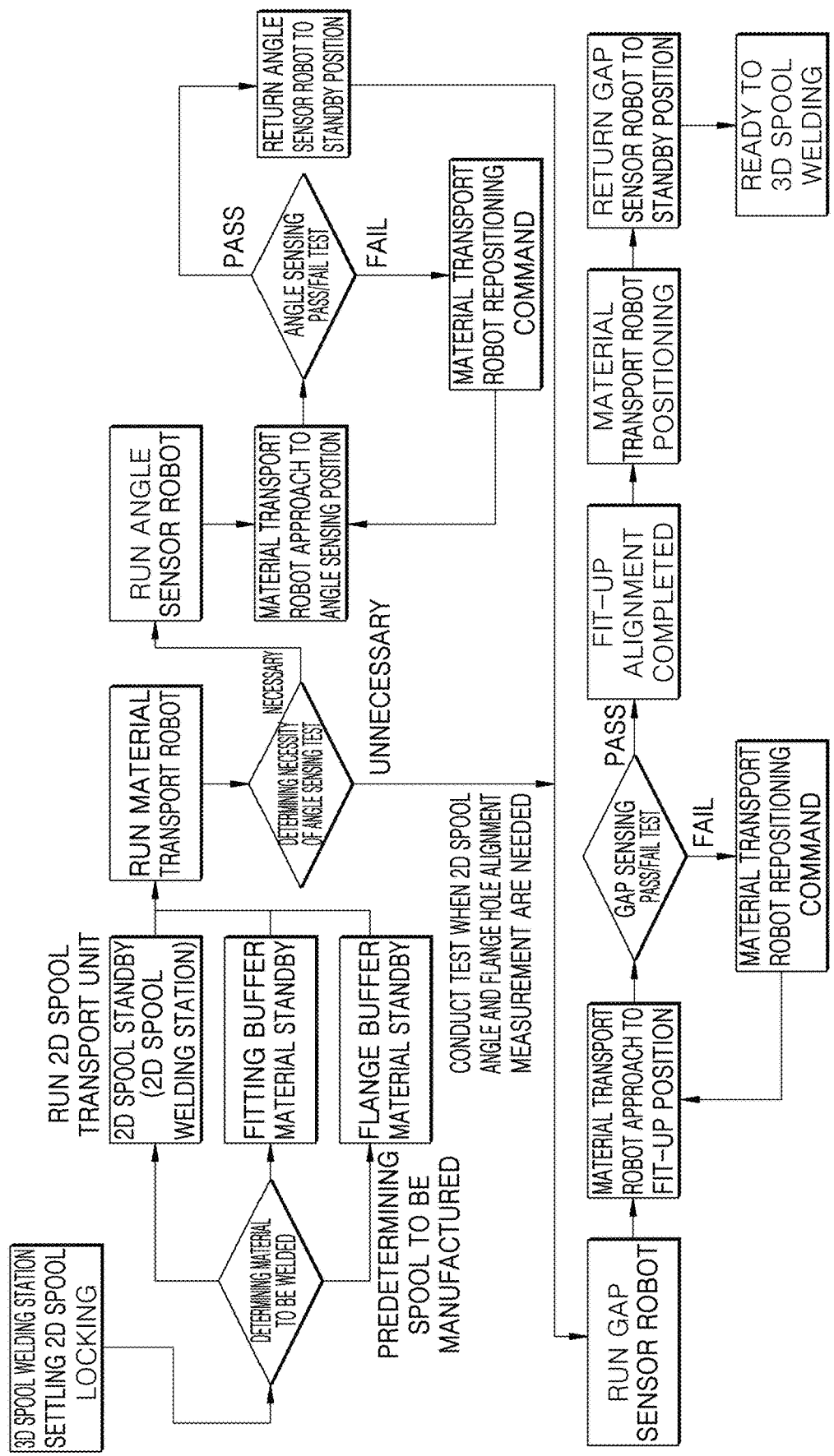
FIGS. 11 and 12 are diagrams for explaining an automatic welding method according to a second embodiment of the present disclosure.
Figure 12:
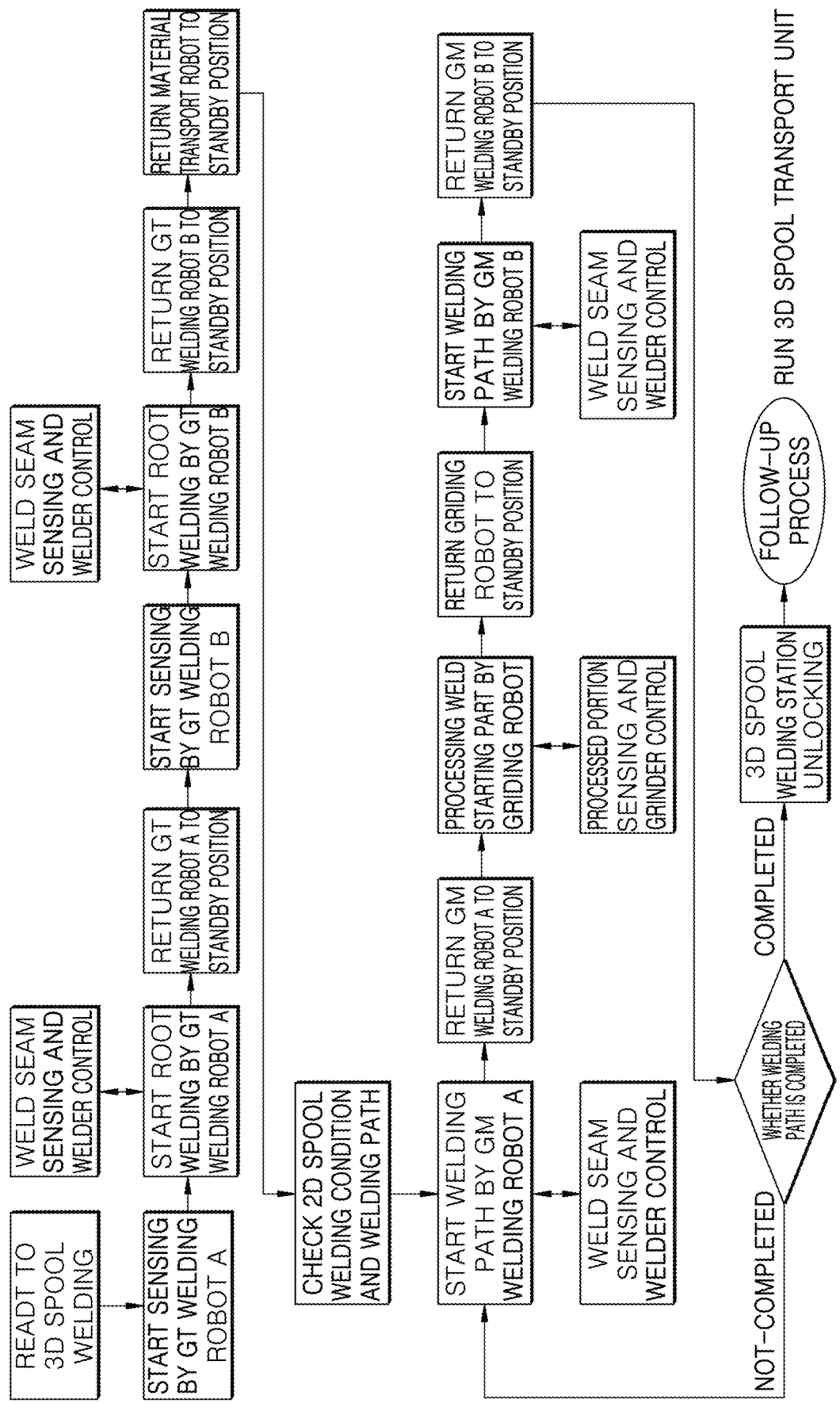

FIGS. 11 and 12 are diagrams for explaining an automatic welding method according to a second embodiment of the present disclosure.

Referring to FIGS. 11 and 12, an automatic welding method according to the second embodiment of the present disclosure may be performed through the following processes.

First, referring to FIG. 11, a material transport robot carries a 2D spool manufactured according to an automatic welding method according to the first embodiment of the present disclosure in which a weld groove (WG) is formed in a form of a true circle and settles the 2D spool at a fit-up position in a welding station (i.e., 3D spool welding station) (step (S210)). Specifically, the 2D spool may be held and fixed by rollers (not shown) installed in the welding station.

Thereafter, the control unit (not shown) determines the material to be welded to determine the spool to be manufactured For example, the control unit may select a 2D spool, fitting material or a flange material as a material to weld to the 2D spool.

Thereafter, according to instructions of the control unit, a material transport robot carries the hollow member (a 2D spool, fitting material, or flange material) on which a weld groove is formed in a form of a true circle to a position near the fit-up position in the welding station (step (S220)).

Then, the control unit determines whether an angle sensing test is needed between the 2D spool and the hollow member (step (S230)).

Then, when the control unit determines that an angle sensing test is needed between the 2D spool and the hollow member, an angle sensor robot measures the torsion angle between the 2D spool and the hollow member, and the material transport robot rotates the hollow member by the measured torsion angle (step (S240)). Here, the torsion angle between the 2D spool and the hollow member may be determined by comparing the geometric structure of the pre-aligned two members with the geometric structure of the final 3D spool (this is an angle of a 2D spool, alignment of a flange hole, or the like and is predetermined), and measuring the difference therebetween.

After the step (S240), the material transport robot is fixed in a state gripping the hollow member, and the angle sensor robot may be returned to a standby position.

On the other hand, when the control unit determines that an angle sensing test is not needed between the 2D spool and the hollow member, the step (S240) may be omitted. This corresponds to the case where the geometric structure of the final 3D spool is not critical.

Afterwards, a gap sensor robot measures the alignment state of the hollow member with respect to the 2D spool fixed at the fit-up position in the welding station, and according to the results of measurement, the material transport robot moves the position of the hollow member to align the weld groove of the 2D spool with the weld groove of the hollow member (step (S250)). The step (S250) may be performed repeatedly until an alignment state of the weld groove of the 2D spool and the weld groove of the hollow member reaches an admittable level. As a result, the weld groove (WG) of the 2D spool and the weld groove (WG) of the hollow member (CM) may be all automatically aligned with No-Gap.

After the step (S250), the material transport robot is fixed in a state gripping the hollow member, and the gap sensor robot may be returned to a standby position.

Next, referring to FIG. 12, a GT welding robot performs a root welding to the aligned welding grooves (step (S260)). As a result, the weld groove of the 2D spool and the weld groove of the hollow member may be all automatically primarily welded with No-Tack.

Specifically, the GT welding robot may include a GT welding robot A and a GT welding robot B, and the step (S260) may include (S260-1) welding the left semi-circle area of the entire root welding area by using the GT welding robot A and (S260-2) welding the right semi-circle area of the entire root welding area by using the GT welding robot B. The GT welding robot A and the GT welding robot B may have the same configuration.

More specifically, the GT welding robot may include a first sensor (not shown) and a first welder (not shown).

The first sensor may be configured to continuously measure a position of a root welding seam.

The first welder may be configured to continuously perform a root welding according to a predetermined sequence based on the results of measurement of the first sensor.

Thereafter, the control unit checks a 3D spool welding condition and a welding path.

Then, a GM welding robot performs a filling and cap welding on the aligned weld grooves to manufacture a 3D spool (step (S270)). In this case, the GM welding robot may perform the welding while moving up and down rather than performing a welding in a fixed, flat welding position in a fixed position, because when a GM welding robot performs a welding in a flat welding position, the 2D spool has to rotate, which is difficult to be realized due to constraints in space or in control.

The GM welding robot may include a GM welding robot A and a GM welding robot B, and the step (S270) may include: (S270-1) welding the left semi-circle area of the entire filling and cap welding area from bottom to top by using the GM welding robot A; (S270-2) grinding the weld starting part of the step (S270-1) by using a grinding robot (not shown); and (S270-3) welding the right semi-circle area of the entire filling and cap welding area by using the GM welding robot B. After going through the step (S270-1), a protrusion is formed at the outer lower part of the weld grooves in close contact with each other, and the step (S270-2) is for removing the protrusion.

The GM welding robot may include a second sensor (not shown) and a second welder (not shown), and the second sensor may be configured to continuously measure the position of a filling and cap weld seam, and the second welder may be configured to continuously perform a filling and cap welding according to a predetermined sequence based on the results of measurement of the second sensor.

The GM welding robot A and the GM welding robot B may have the same configuration.

The steps (S230) to (S270) may be performed in a state in which the 2D spool is fixed at the fit-up position in the welding station, and the hollow member is gripped by the material transport robot.

The present disclosure has been described with reference to the drawings, but the drawings are only given as examples, and it will be appreciated by those of ordinary skill in the art that a variety of modifications and equivalent other embodiments are possible. Accordingly, the true scope of the present disclosure should be determined by the technical idea of the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An automatic welding method comprising:
   (S110) carrying a pipe on which a weld groove is formed in a form of a true circle and settling the pipe at a fit-up position in a 2D spool welding station by using a first material transport robot;
   (S120) carrying a hollow connection member on which a weld groove is formed in a form of a true circle to a position near the fit-up position in the 2D spool welding station by using the first material transport robot;
   (S130) measuring an alignment state of the hollow connection member with respect to the fit-up position in the 2D spool welding station by using a first gap sensor robot, and according to a measurement result, moving a position of the hollow connection member by using the first material transport robot to align the weld groove of the pipe with the weld groove of the hollow connection member
   (S140) performing a root welding on the aligned weld grooves by using a first GT welding robot;
   (S150) performing a filling and cap welding on the aligned weld grooves by using a first GM welding robot to manufacture a 2D spool;
   (S210) carrying a 2D spool manufactured in the step (S150) and on which a weld groove is formed in a form of a true circle and settling the 2D spool at a fit-up position in a 3D spool welding station by using a second material transport robot;
   (S220) carrying a hollow member on which a weld groove is formed in a form of a true circle to a position near a fit-up position in the 3D spool welding station by using the second material transport robot;
   (S230) determining whether an angle sensing test is needed between the 2D spool and the hollow member by using a control unit;
   (S240) measuring a torsion angle between the 2D spool and the hollow member by using an angle sensor robot and rotating the hollow member by the measured torsion angle by using the second material transport robot, when the control unit determines that an angle sensing test is needed between the 2D spool and the hollow member;
   (S250) measuring an alignment state of the hollow member with respect to the fit-up position in the 3D spool welding station by using a second gap sensor robot, and according to a measurement result, moving the position of the hollow member to align the weld groove of the 2D spool with the weld groove of the hollow member by using the second material transport robot;
   (S260) performing a root welding on the aligned weld grooves by using a second GT welding robot; and
   (S270) performing a filling and cap welding on the aligned weld grooves to manufacture a 3D spool by using a second GM welding robot,
   wherein the second GM welding robot includes a second GM welding robot A and a second GM welding robot B, and the step (S270) includes:
   (S270-1) welding a left semi-circle area of an entire filling and cap welding area from bottom to top by using the second GM welding robot A;
   (S270-2) grinding a weld starting part of the step (S270-1) by using a grinding robot; and
   (S270-3) welding a right semi-circle area of the entire filling and cap welding area by using the second GM welding robot B.

2. The automatic welding method of claim 1, wherein the steps (S130) to (S150) are performed in a state in which the pipe is fixed at the fit-up position in the 2D spool welding station, and the hollow connection member is gripped by the first material transport robot, wherein the pipe is held and fixed by rollers installed in the 2D spool welding station.

3. The automatic welding method of claim 1, wherein the first GT welding robot includes a first GT welding robot A and a first GT welding robot B, and the step (S140) includes (S140-1) welding the left semi-circle area of the entire root welding area by using the first GT welding robot A and (S140-2) welding the right semi-circle area of the entire root welding area by using the first GT welding robot B.

4. The automatic welding method of claim 1, wherein the first GT welding robot includes a 1-1 sensor and a 1-1 welder, the 1-1 sensor being configured to continuously measure a position of a root weld seam, and the 1-1 welder being configured to continuously perform a root welding according to a predetermined sequence based on a measurement result of the 1-1 sensor.

5. The automatic welding method of claim 1, wherein the step (S150) is performed in a state in which the root-welded pipe and the root-welded hollow connection member are simultaneously rotated by a plurality of rollers installed in the 2D spool welding station, and the first GM welding robot performs a filling and cap welding by a flat welding.

6. The automatic welding method of claim 1, wherein the weld groove includes:
   a 1-1 curved surface, a 1-2 curved surface, a 1-3 curved surface and a 1-4 curved surface formed each on the outer wall of the pipe and on the outer wall of the hollow connection member, the 1-1 curved surface being slantly formed so that a thickness at a first point far from a side end of the hollow connection member is thick, and a thickness at a second point close to the side end of the hollow connection member is thin; the 1-2 curved surface being slantly formed so that a thickness at the second point far from the side end of the hollow connection member is thick, and a thickness at a third point close to the side end of the hollow connection member is thin; the 1-3 curved surface being slantly formed so that a thickness at the third point far from the side end of the hollow connection member is thick, and a thickness at a fourth point close to the side end of the hollow connection member is thin; and the 1-4 curved surface being formed so that a thickness is constant from the fourth point close to the side end of the hollow connection member to the side end of the hollow connection member;

a vertical surface formed between the inner wall and the outer wall of the pipe and a vertical surface formed between the inner wall and the outer wall of the hollow connection member; and a 2-1 curved surface and a 2-2 curved surface formed each on the inner wall of the pipe and on the inner wall of the hollow connection member, the 2-1 curved surface being formed so that a thickness is constant from the side end of the pipe or the hollow connection member to a fifth point separated from the side end of the pipe or the hollow connection member; and the 2-2 curved surface being slantly formed so that a fifth point separated from the side end of the pipe or the hollow connection member is thin, and a thickness at a sixth point far from the side end of the pipe or the hollow connection member is thick.

7. The automatic welding method of claim 6, wherein the 1-1 curved surface is formed so that a thickness decreases at a constant rate from the first point to the second point.

8. The automatic welding method of claim 6, wherein the 1-2 curved surface is formed so that a thickness decreases at a constant rate from the second point to the third point.

9. The automatic welding method of claim 6, wherein the 1-3 curved surface is formed so that a thickness decreases according to a predetermined radius of curvature from the third point to the fourth point.

10. The automatic welding method of claim 6, wherein a length of the 1-4 curved surface is 2 mm to 3 mm.

11. The automatic welding method of claim 6, wherein a thickness of the vertical surface formed each on the side end of the pipe and the side end of the hollow connection member is 1 mm to 2 mm.

12. The automatic welding method of claim 6, wherein the 2-2 curved surface is formed so that a thickness increases at a constant rate from the fifth point to the sixth point.

13. The automatic welding method of claim 6, wherein the first point is positioned far from the side end of the pipe or the hollow connection member than the sixth point, and the second point is close to the side end of the pipe or the hollow connection member than the fifth point.

14. The automatic welding method of claim 13, wherein a thickness between the inner wall and the outer wall of the pipe at the second point is 87.5% to 95% with respect to 100% of the thickness between the inner wall and the outer wall of the pipe at the first point, and a thickness between the inner wall and the outer wall of the hollow connection member at the second point is 87.5% to 95% with respect to 100% of the thickness between the inner wall and the outer wall of the hollow connection member at the first point.

15. The automatic welding method of claim 1, wherein the second GT welding robot includes a second GT welding robot A and a second GT welding robot B, and the step (S260) includes (S260-1) welding the left semi-circle area of the entire root welding area by using the second GT welding robot A and (S260-2) welding the right semi-circle area of the entire root welding area by using the second GT welding robot B.

16. The automatic welding method of claim 1, wherein the second GT welding robot comprises a 1-2 sensor and a 1-2 welder, and the 1-2 sensor is configured to continuously measure a position of a root weld seam, and the 1-2 welder is configured to continuously perform a root welding according to a predetermined sequence based on the results of measurement of the 1-2 sensor.

17. The automatic welding method of claim 1, wherein the second GM welding robot comprises a second sensor and a second welder, and the second sensor is configured to continuously measure the position of a filling and cap weld seam, and the second welder is configured to continuously perform a filling and cap welding according to a predetermined sequence based on the results of measurement of the second sensor.

* * * * *